US006626959B1

(12) United States Patent
Moise et al.

(10) Patent No.: US 6,626,959 B1
(45) Date of Patent: Sep. 30, 2003

(54) AUTOMATIC FORMATTING OF PIVOT TABLE REPORTS WITHIN A SPREADSHEET

(75) Inventors: Wesner P. Moise, Redmond, WA (US); Thomas P. Conlon, Redmond, WA (US); Michelle Lee Thompson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/332,958

(22) Filed: Jun. 14, 1999

(51) Int. Cl.[7] .......................... G06F 15/00; G06F 17/00

(52) U.S. Cl. .................... 715/522; 715/503; 715/517; 715/523; 715/906

(58) Field of Search ............................... 707/503, 517, 707/522, 523, 906; 715/503, 517, 522, 523, 906

(56) References Cited

U.S. PATENT DOCUMENTS

| | | | | |
|---|---|---|---|---|
| 5,119,465 A | * | 6/1992 | Jack et al. | 717/137 |
| 5,317,686 A | * | 5/1994 | Salas et al. | 707/503 |
| 5,361,393 A | * | 11/1994 | Rossillo | 709/100 |
| 5,418,898 A | * | 5/1995 | Zand et al. | 707/503 |
| 5,550,964 A | * | 8/1996 | Davoust | 345/440 |
| 5,581,678 A | * | 12/1996 | Kahn | 345/440 |
| 5,604,854 A | * | 2/1997 | Glassey | 345/419 |
| 5,915,257 A | * | 6/1999 | Gartung et al. | 707/503 |
| 6,134,563 A | * | 10/2000 | Clancey et al. | 706/45 |
| 6,216,139 B1 | * | 4/2001 | Listou | 707/503 |
| 6,260,044 B1 | * | 7/2001 | Nagral et al. | 358/1.13 |
| 6,292,811 B1 | * | 9/2001 | Clancey et al. | 705/30 |
| 6,298,342 B1 | * | 10/2001 | Graefe et al. | 707/101 |
| 6,317,750 B1 | * | 11/2001 | Tortolani et al. | 345/853 |
| 6,321,241 B1 | * | 11/2001 | Gartung et al. | 345/440 |
| 6,393,441 B1 | * | 5/2002 | Kanerva et al. | 358/1.13 |

OTHER PUBLICATIONS

Neris, Marina, "BrioQuery 5.5x Using Banner", Mar. 10, 1999, The Desktop Technologies Group, pp. 1–26.*
Jewett et al., "What's New in BrioQuery 6.0", Jun. 1999, Brio Technology, Inc., pp. 1–55.*
Desmarais, B., "Using the Microsoft Excel Pivot Table for Reliability Applications", Apr. 1996, Reliability Symposium, 1996. Reliability—Investing in the Future., IEEE 34th Annual Spring, pp. 1–13.*
Chester et al., "Mastering Excel 97", 1997, Sybex Inc., pp. 668–670, 927, and 935.*
Gray et al., "Data Cube: A Relational Aggregation Operator Generalizing Group–By, Cross–Tab, and Sub–Totals", 1997, Data Mining and Knowledge Discovery, pp. 1–53.*
Hardman, Harriett; Brio Query Development Team. Brio Query: Data Access Guide. Brio Technology, Inc. Query and Reporting Manual. 1994. pp. 89–119.

* cited by examiner

Primary Examiner—Joseph H. Feild
Assistant Examiner—Almari Romero
(74) Attorney, Agent, or Firm—Ronald M. Anderson (57) ABSTRACT

Automatically formatting a spreadsheet pivot table using one of a plurality of predefined formats that include banded report formats and tabular report formats. The pivot table is reformatted automatically, based on a user selection of a predefined banded table or tabular format. Alternatively, the format of an original pivot table or a reformatted pivot table may be changed based on user choices made from a plurality of formatting dialogs. The automatically and modified formats include field emphasis, positioning of group totals, and insertion of blank lines. The predefined formats include a variety of different font styles, colors, backgrounds and borders. A reformatted pivot table has an enhanced appearance, while maintaining the full-functionality associated with a spreadsheet pivot table. The underlying format of a reformatted pivot table is maintained, allowing a user to move, add, or delete fields and add or remove calculated data without altering the overall format of the reformatted pivot table.

19 Claims, 11 Drawing Sheets

|   | A | B | C | D | E | F | G |
|---|---|---|---|---|---|---|---|
| 1 | Country | Region | State | Product Line | Unit | Revenue | Expenses |
| 2 | USA | NE | MA | Clothes | shoes | 1000000 | 40 |
| 3 | USA | NE | CT | Clothes | shoes | 44 | 40 |
| 4 | USA | NW | WA | Clothes | shoes | 25 | 20 |
| 5 | USA | NW | OR | Clothes | shoes | 30 | 29 |
| 6 | Canada | E | PQ | Clothes | shoes | 50 | 45 |
| 7 | Canada | E | ON | Clothes | shoes | 99 | 90 |
| 8 | Canada | W | BC | Clothes | shoes | 88 | 80 |
| 9 | Canada | W | AL | Clothes | shoes | 40 | 20 |
| 10 | USA | NE | MA | Food | pasta | 60 | 20 |
| 11 | USA | NE | CT | Food | pasta | 45 | 44 |
| 12 | USA | NW | WA | Food | pasta | 33 | 22 |
| 13 | USA | NW | OR | Food | pasta | 50 | 20 |
| 14 | Canada | E | PQ | Food | pasta | 50 | 49 |
| 15 | Canada | E | ON | Food | pasta | 60 | 50 |
| 16 | Canada | W | BC | Food | pasta | 90 | 88 |
| 17 | Canada | W | AL | Food | pasta | 44 | 39 |
| 18 | USA | NE | MA | Clothes | pants | 80 | 20 |
| 19 | USA | NE | CT | Clothes | pants | 33 | 33 |
| 20 | USA | NW | WA | Clothes | pants | 22 | 21 |
| 21 | USA | NW | OR | Clothes | pants | 20 | 30 |
| 22 | Canada | E | PQ | Clothes | pants | 55 | 44 |
| 23 | Canada | E | ON | Clothes | pants | 98 | 91 |
| 24 | Canada | W | BC | Clothes | pants | 81 | 81 |
| 25 | Canada | W | AL | Clothes | pants | 44 | 43 |
| 26 | USA | NE | MA | Food | milk | 60 | 25 |
| 27 | USA | NE | CT | Food | milk | 44 | 40 |
| 28 | USA | NW | WA | Food | milk | 33 | 22 |
| 29 | USA | NW | OR | Food | milk | 55 | 11 |
| 30 | Canada | E | PQ | Food | milk | 44 | 40 |
| 31 | Canada | E | ON | Food | milk | 66 | 55 |
| 32 | Canada | W | BC | Food | milk | 95 | 87 |
| 33 | Canada | W | AL | Food | milk | 49 | 41 |
| 34 | | | | | | | |

*FIG. 1*

|    | A | B | C | D | E |
|----|---|---|---|---|---|
| 1  |   |   |   |   |   |
| 2  |   |   |   |   |   |
| 3  | COUNTRY ▼ | REGION ▼ | STATE ▼ | DATA ▼ | TOTAL |
| 4  | CANADA | E | ON | SUM OF REVENUE | 323 |
| 5  |   |   |   | SUM OF EXPENSES | 286 |
| 6  |   |   | PQ | SUM OF REVENUE | 199 |
| 7  |   |   |   | SUM OF EXPENSES | 178 |
| 8  |   | E SUM OF REVENUE |   |   | 522 |
| 9  |   | E SUM OF EXPENSES |   |   | 464 |
| 10 |   | W | AL | SUM OF REVENUE | 177 |
| 11 |   |   |   | SUM OF EXPENSES | 143 |
| 12 |   |   | BC | SUM OF REVENUE | 354 |
| 13 |   |   |   | SUM OF EXPENSES | 336 |
| 14 |   | W SUM OF REVENUE |   |   | 531 |
| 15 |   | W SUM OF EXPENSES |   |   | 479 |
| 16 | CANADA SUM OF REVENUE |   |   |   | 1053 |
| 17 | CANADA SUM OF EXPENSES |   |   |   | 943 |
| 18 | USA | NE | CT | SUM OF REVENUE | 166 |
| 19 |   |   |   | SUM OF EXPENSES | 157 |
| 20 |   |   | MA | SUM OF REVENUE | 1000200 |
| 22 |   |   |   | SUM OF EXPENSES | 105 |
| 23 |   | NE SUM OF REVENUE |   |   | 1000366 |
| 24 |   | NE SUM OF EXPENSES |   |   | 262 |
| 25 |   | NW | OR | SUM OF REVENUE | 155 |
| 26 |   |   |   | SUM OF EXPENSES | 90 |
| 27 |   |   | WA | SUM OF REVENUE | 113 |
| 28 |   |   |   | SUM OF EXPENSES | 85 |
| 29 |   | NW SUM OF REVENUE |   |   | 268 |
| 30 |   | NW SUM OF EXPENSES |   |   | 175 |
| 31 | USA SUM OF REVENUE |   |   |   | 1000634 |
| 32 | USA SUM OF EXPENSES |   |   |   | 437 |
| 33 | TOTAL SUM OF REVENUE |   |   |   | 1001687 |
| 34 | TOTAL SUM OF EXPENSES |   |   |   | 1380 |

| COUNTRY ▼ | REGION ▼ | STATE ▼ | REVENUE | EXPENSES |
|---|---|---|---|---|
| CANADA | E | | 522 | 464 |
| | | ON | 323 | 286 |
| | | PQ | 199 | 178 |
| | W | | 531 | 479 |
| | | AL | 177 | 143 |
| | | BC | 354 | 336 |
| CANADA TOTAL | | | 1053 | 943 |
| USA | NE | | 1000366 | 262 |
| | | CT | 166 | 157 |
| | | MA | 1000200 | 105 |
| | NW | | 268 | 175 |
| | | OR | 155 | 90 |
| | | WA | 113 | 85 |
| USA TOTAL | | | 1000634 | 437 |
| GRAND TOTAL | | | 1001687 | 1380 |

| COUNTRY ▼ | REGION ▼ | STATE ▼ | REVENUE | EXPENSES |
|---|---|---|---|---|
| CANADA | | | 1053 | 943 |
| | E | | | |
| | | ON | 323 | 286 |
| | | PQ | 199 | 178 |
| | E TOTAL | | 522 | 464 |
| | W | | | |
| | | AL | 177 | 143 |
| | | BC | 354 | 336 |
| | W TOTAL | | 531 | 479 |
| USA | | | 1000634 | 437 |
| | NE | | | |
| | | CT | 166 | 157 |
| | | MA | 1000200 | 105 |
| | NE TOTAL | | 1000366 | 262 |
| | NW | | | |
| | | OR | 155 | 90 |
| | | WA | 113 | 85 |
| | NW TOTAL | | 268 | 175 |
| GRAND TOTAL | | | 1001687 | 1380 |

| REGION ▼ | STATE ▼ | COUNTRY ▼ | DATA ▼ | | | TOTAL SUM OF REVENUE | TOTAL SUM OF EXPENSES |
|---|---|---|---|---|---|---|---|
| | | CANADA | | USA | | | |
| | | REVENUE | EXPENSES | REVENUE | EXPENSES | | |
| E | ON | 323 | 286 | | | 323 | 286 |
| | PQ | 199 | 178 | | | 199 | 178 |
| E TOTAL | | 522 | 464 | | | 522 | 464 |
| NE | CT | | | 166 | 157 | 166 | 157 |
| | MA | | | 1000200 | 105 | 1000200 | 105 |
| NE TOTAL | | | | 1000366 | 262 | 1000366 | 262 |
| NW | OR | | | 155 | 90 | 155 | 90 |
| | WA | | | 113 | 85 | 113 | 85 |
| NW TOTAL | | | | 268 | 175 | 268 | 175 |
| W | AL | 177 | 143 | | | 177 | 143 |
| | BC | 354 | 336 | | | 354 | 336 |
| W TOTAL | | 531 | 479 | | | 531 | 479 |
| GRAND TOTAL | | 1053 | 943 | 1000634 | 437 | 1001687 | 1380 |

AUTOMATIC FORMATTING OF PIVOT TABLE REPORTS WITHIN A SPREADSHEET

FIELD OF THE INVENTION

The present invention generally relates to pivot tables within a spreadsheet program, and more specifically, to the formatting of such pivot tables.

BACKGROUND OF THE INVENTION

Pivot tables have been provided in Microsoft Corporation's EXCEL™ spreadsheet program for several years. A pivot table provides an efficient way to display and summarize data that is included in a database or in the data listing of a spreadsheet by automatically displaying fields of the data in a manner determined by the user and by determining and displaying selected parameters such as the sum, variance, count, standard deviation, etc. of selected data fields. Relatively structured spreadsheets that already have subtotals, data entry cells, and summaries of fields are generally not appropriately expressed using a pivot table. In contrast, any data included in a database that can be queried from within the spreadsheet, or spreadsheet data comprising lists that are not already summarized are ideal candidates for the power of pivot tables.

Although pivot tables are a very powerful tool for processing and displaying data, they often are not in an acceptable form for presentation in a written or live report when they are initially produced. The creation of a pivot table produces a tabular grouping of data laid out in a non-traditional grid format that is generally plain, wherein the information provided by the data may not be intuitive to some observers, or be difficult to understand. It would be preferable to arrange the data presented in a pivot table in a more traditional format, such as a banded report layout.

Banded reports have been the predominate database reporting paradigm since use of computers in large corporations became commonplace. In a typical scenario, a manager might make a request to a corporation's computing department (somewhat analogous to today's MIS department) for a report showing the sales of products A, B, and C, organized by territory and responsible sales representative, on a quarterly basis, for the past 3 years. The computing department would then deliver the requested information printed on paper, organized in a tiered, hierarchical form, usually with subtotals for each level and sub-level of the hierarchy. A hierarchy in such a report is generally formed by grouping individual fields together, based on shared field attributes or values. Although this process was slow and cumbersome, the form of the data as presented was very intuitive and understandable. As a result, banded reports have become a de facto standard for organizing the presentation of such data in reports.

At present, the most common types of programs that generate banded reports are database applications. A prior art example of such an application is the BRIO QUERY program distributed by the Brio Technology Corporation of Mountain View, Calif. This program enables the creation of a banded report called a "Pivot Report" through the use of a tool called an "Outliner." However, the data in the banded report are developed by applying a query to database data. The data used to create the Pivot Report and the Pivot Report itself cannot be manipulated like data in a spreadsheet or in the pivot table of a spreadsheet program. This inability to manipulate the data in the prior art Pivot Report, for example, by associating formulas or functions with portions of the data, greatly limits the flexibility of a database-type banded report; reformulating various fields in the report, such as totals or averages, cannot be accomplished in this prior art Pivot Report without recreating the entire report through a new query. Additionally, pivot table functionality, such as drilldown (which enables only selected groups of data to be displayed in the pivot table), is not available in a banded report created within this prior art database program. Clearly, it would be desirable to provide a spreadsheet program that could generate a banded report based on data included in a spreadsheet pivot table, while maintaining the functionality of the spreadsheet for manipulating data and other aspects of the pivot table. It would also be desirable to easily add or change various formatting attributes, such as font color, size, style, and borders of existing pivot tables or banded reports created therefrom.

SUMMARY OF THE INVENTION

The present invention overcomes the foregoing limitations of the prior art by providing a method that enables a user to selectively reformat a spreadsheet pivot table into one of a plurality of predefined formats, including various banded report formats. The pivot table can be reformatted automatically, based on a user selection from a plurality of predefined banded table and tabular formats, or it may be incrementally formatted through user interaction with a plurality of formatting dialogs. The reformatted pivot table provides an enhanced appearance to a pivot table, while maintaining its full functionality within the spreadsheet program.

According to a first aspect of the invention, a method is provided for enabling a user to selectively reformat a spreadsheet pivot table presenting a specified set of data with an original format. The pivot table has an original functionality comprising a set of direct manipulation pivot table operations that can be performed on the pivot table and which affect the data contained within it. The method provides a user interface that enables a user to select a predefined banded report format to be applied to the pivot table from a plurality of predefined banded report formats, preferably from a plurality of thumbnail representations that graphically portray an exemplary appearance of the reformatted pivot table. The pivot table is then automatically reformatted based on the selected banded report format and specified set of data. The reformatted pivot table maintains its original functionality, thereby enabling a user to perform any of the direct manipulation pivot table operations on the reformatted pivot table that could be performed on the pivot table prior to reformatting. The plurality of predefined banded report formats includes formats that comprise outlined fields, and differ in various other ways, such as displaying grouped summary calculations in the first line or last line of a group, and inserting blank lines between groups of data. The plurality of predefined formats also comprises a variety of color, border, and font style schemes, enabling the user to easily produce a desired banded table report based on the pivot table.

In order to obtain the desired banded table report format, it may be necessary to rotate fields within the pivot table. As with all pivot tables, the original format of the pivot table comprises a left-hand portion defining a row region comprising a first row listing names of row fields and successive rows containing associated data items for the row fields and calculated-data labels. A data region is disposed adjacent to the row region and includes calculated numerical data associated corresponding to the calculated-data labels. A column field region is disposed immediately above the data region and includes field names included within the column region and labels corresponding to the calculated numerical data.

The rotation of the fields when creating the reformatted pivot table is performed by pivoting any column fields to the row region, and pivoting the calculated data labels to the column region.

The plurality of predefined formats preferably also includes a plurality of tabular formats, again comprising a variety of different color, border, and font style schemes. A primary difference between the banded report formats and the tabular formats is that the latter doesn't provide for field outlining. The list of predefined formats also includes an option to return a reformatted pivot table back to its original format, and to produce a pivot table with no formatting.

According to another aspect of the invention, a method is defined that enables a user to selectively reformat a pivot table on an incremental basis. A user can selectively apply various formatting options to an original-format pivot table, or to a reformatted pivot table that has already been automatically reformatted using the method described above. The formatting options include applying an outline format to a selected field, selectively locating totals for data at the top or bottom of a group, selectively including blank lines between data groups, and creating page breaks between data groups when the pivot table is printed. The options also enable an outlined field to be returned to it original tabular format. The various options can be sequentially applied (although some options are applied simultaneously) to a pivot table to achieve a desired format.

The reformatted pivot table can subsequently be changed, so that fields can be moved within the pivot table, or added or removed, and various functions applied to numerical data can be included in or deleted from the pivot table—while maintaining the underlying format scheme of the pivot table, because the formatting is associated with the pivot table as a whole, and not with individual cells within the pivot table, as would normally be the case with a cell in a spreadsheet.

According to other aspects of the invention, a computer-readable medium comprising machine instructions for performing the methods discussed are also provided. The computer-readable medium is preferably in the form of a medium that is readily manufactured and distributed, such as a floppy disk or CD-ROM.

Yet another aspect of the present invention is directed to a system that comprises a computer programmed to implement a spreadsheet program that carries out functions generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
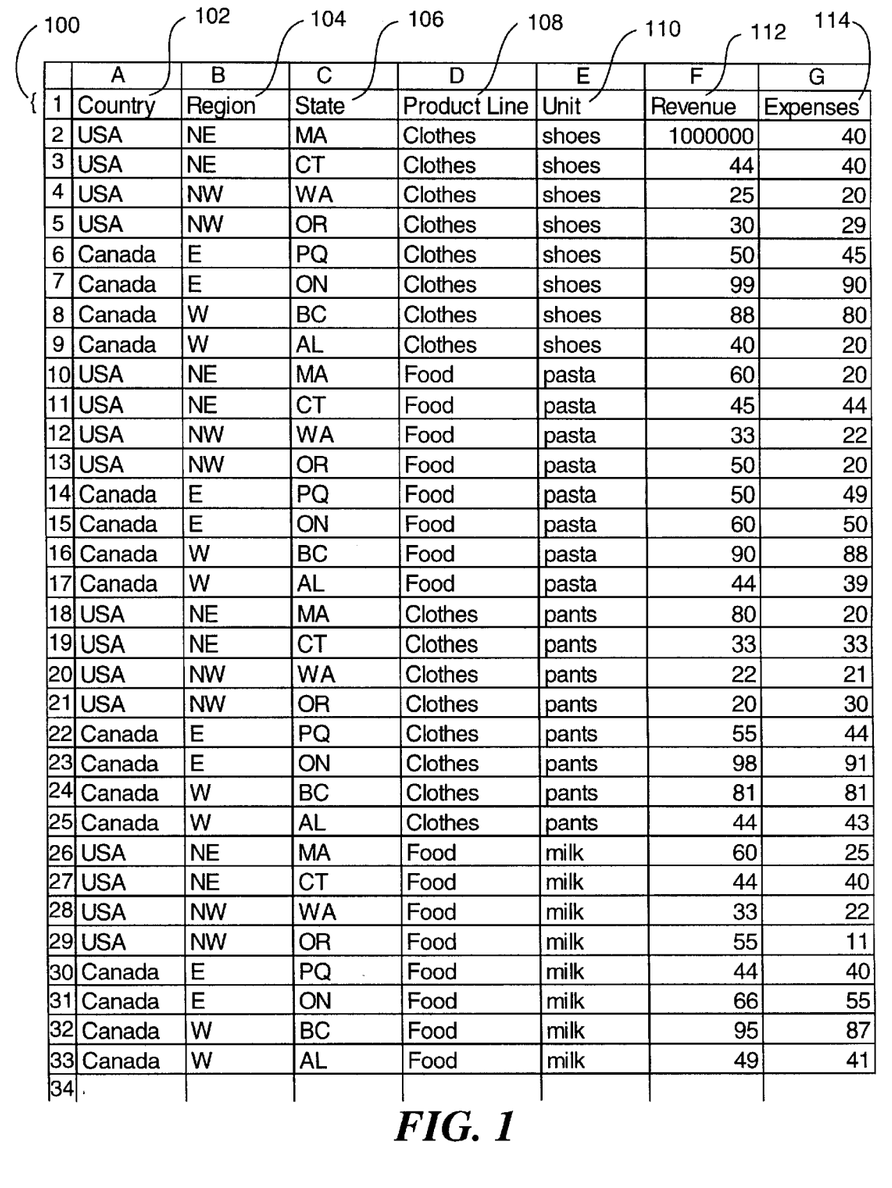
FIG. 1 shows an exemplary data listing as it would appear in a portion of a spreadsheet.

An exemplary set of data entered into a spreadsheet is shown in FIG. 1. The data shown might relate to a company that has stores in various states and provinces in the United States and Canada and are arranged in a tabular manner, with entries for each field displayed in a different column. A first row 100 contains a plurality of column headings that identify the fields corresponding to the data items in each respective column, including a Country field 102, a Region field 104, a State field 106, a Product Line field 108, a Unit field 110, a Revenue field 112, and an Expenses field 114. Each column contains data (alpha or numerical values) corresponding to the field for that column. For example, the data under the "Region" column include "NE," "NW," "E," and "W;" and the data under the "State" column identify various states (or provinces) by their standard abbreviations. Each row in the table (below the first row) represents a data record that includes the various field values under each column. The data in the "Revenue" and "Expenses" columns are numerical data for a particular record. Each data record thus lists the revenue and expenses for a unique combination of the other fields. Data of the type shown in FIG. 1 may readily be retrieved from various data sources, such as a database, or may be entered directly in a spreadsheet program, such as Microsoft Corporation's EXCEL 2000™ spreadsheet program, which will include a preferred embodiment of the present invention.

The data in the first three fields are hierarchical, such that all of the data in the State field, i.e., the various states and provinces, are all within one of the regions listed in the Region field, and each region listed is within one of the countries listed in the Country field. Data records are often organized in such hierarchical groupings, and these types of hierarchical groupings are readily organized and displayed in pivot tables and in banded reports.

Figure 2:
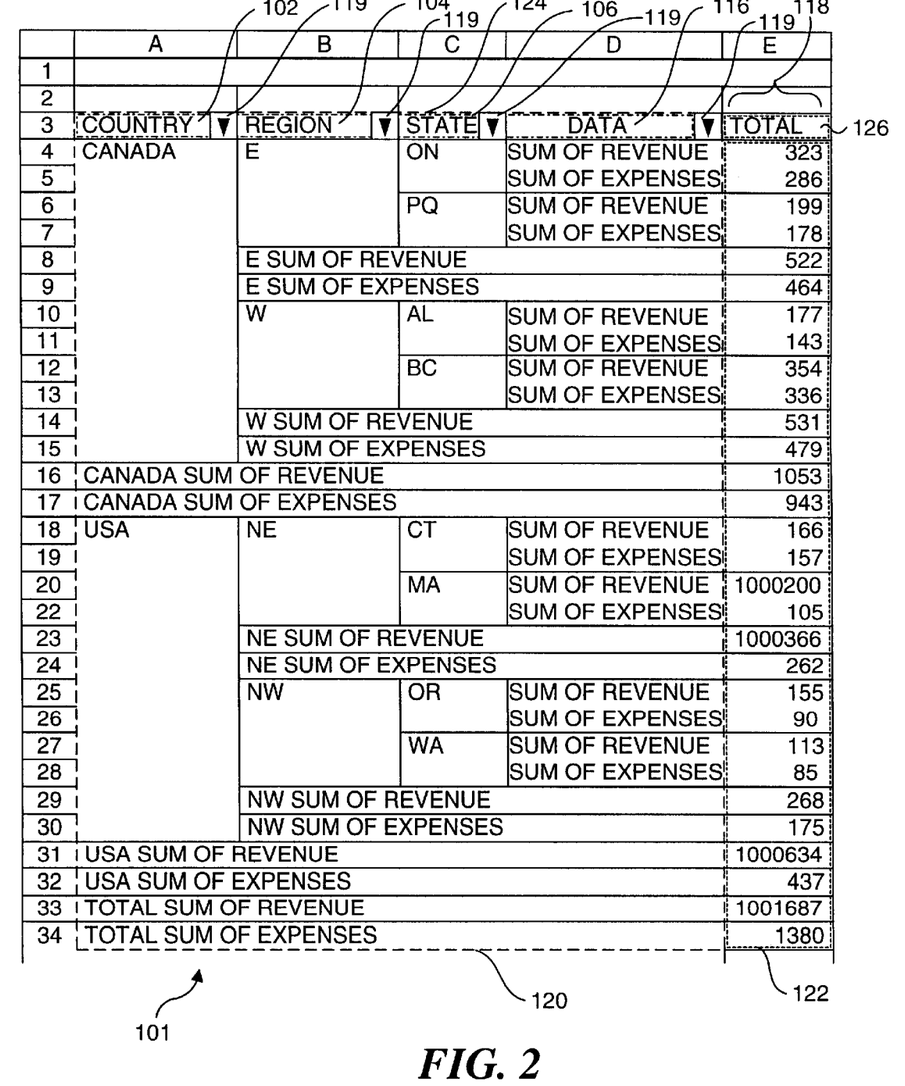
FIG. 2 is an exemplary pivot table created from the data of FIG. 1 using the EXCEL program.

FIG. 2 illustrates an exemplary pivot table 101 created from the data listed in FIG. 1. The pivot table includes various fields and associated data that are derived from the fields and the data contained in the spreadsheet shown in FIG. 1. The user creates a pivot table by selecting specific fields from the data and functions that will appear in the pivot table, and by specifying the organization of those fields and functions in the pivot table. Some of the pivot table cells contain information that is directly input from the source data, including Country field 102, Region field 104, and State field 106. The pivot table additionally includes the results of numerical functions or operations applied to fields of the data shown in the spreadsheet of FIG. 1. For instance, under a "DATA" label 116 are labels for the Sum of Revenue and the Sum of Expenses, with totals of the numeric data included on a state, region, and country grouping, under an adjacent column 118 labeled "TOTAL."

The arrangement of the fields and associated data labels in the pivot table and the calculation of the pivot table data are automatically performed by the spreadsheet program based on user input and user field selections and arrangement of the selected fields. The sums in column 118 are calculated based on the data contained in the Revenue and Expenses fields of FIG. 1, grouped by record on a hierarchical basis, from the bottom up, first by state, then by region, and finally by country. The pivot table first displays data for the Canadian stores, followed by data for the USA stores.

A drop-down list control 119 is provided adjacent to (at the right side) of each field label and may be selected to display a drop-down checkbox list that enables the user to choose various data from among the different data for that field to be displayed in the pivot table. For example, a user can activate the Region field drop-down list control to bring up a list of regions (not shown) that includes E, W, NE, and NW; adjacent to each region in the list is a checkbox that is checked by default (so that all regions are included in the pivot table). By clicking on the checkbox adjacent to a desired region, the user can toggle the displayed data for that region and thereby indicate the regions that should be included in the pivot table. Data for any regions that are not check by the user are not included in the pivot table. The selection thus is a filter. A similar result can be achieved by entering a check in the checkbox of selected data in the Country field drop-down list control, and in the Data drop-down list control.

The pivot table of FIG. 2 includes a row region 120, which is encompassed by a medium-dashed-line box; a data region 122, which is encompassed by a small-dashed-line box extending down the right side of the pivot table; a row field area 124, encompassed by a dash-dot-line box; and a column field area 126, encompassed by a small-dashed-line box at the upper right comer of the pivot table. These regions and field areas are more clearly shown in FIG. 3 as they appear in a drag-and-drop form employed to enable a user to create a pivot table. Row region 120 contains data grouped on a columnar basis by their associated fields, which are listed in row field area 124 in the first row of the row region. The data region contains calculated data based on original data records by applying selected functions such as sum, average, min, max, standard deviation, etc., to the fields introduced into the data region, as specified during creation of the pivot table. The column region is disposed above the data region, and can contain one or more fields as determined during the creation of the pivot table. In the example shown in FIG. 2, there are no fields in the column region and no fields in a page region 128 (see FIG. 3).

Figure 3:
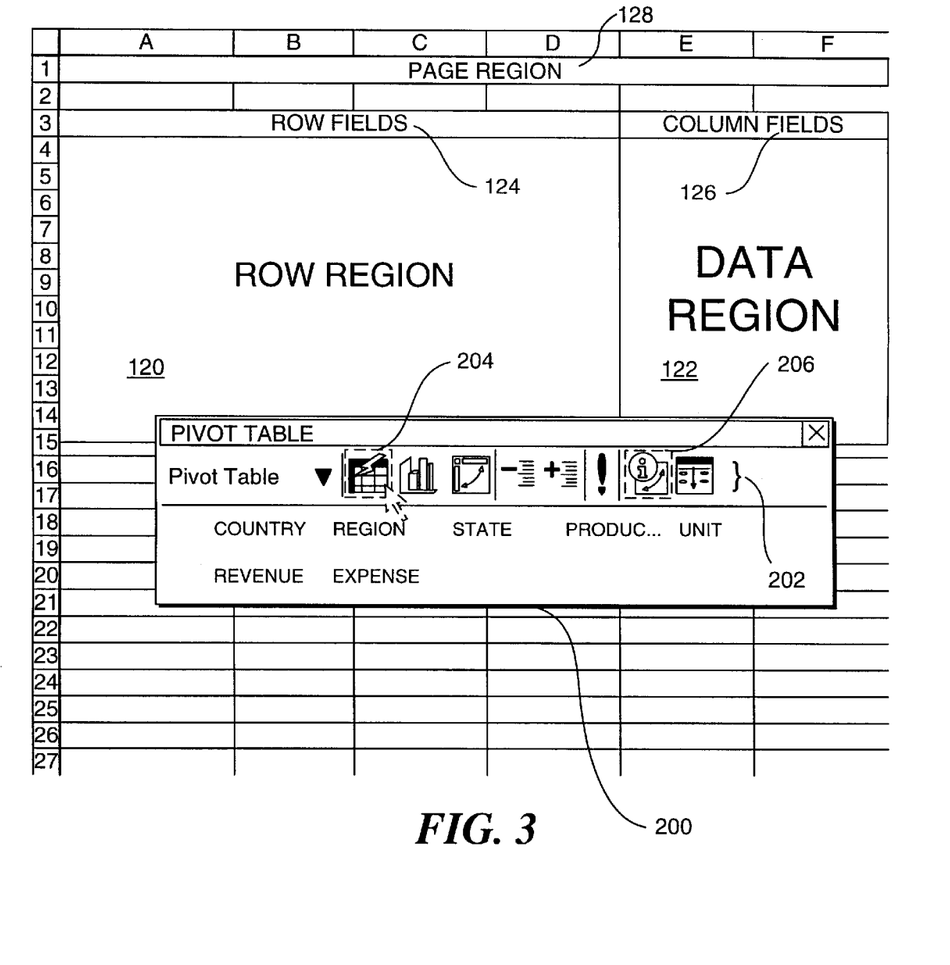
FIG. 3 illustrates a portion of a spreadsheet and shows the primary regions and field areas of a pivot table, along with a pivot table toolbar user interface that is employed to create a pivot table.
Figure 4:
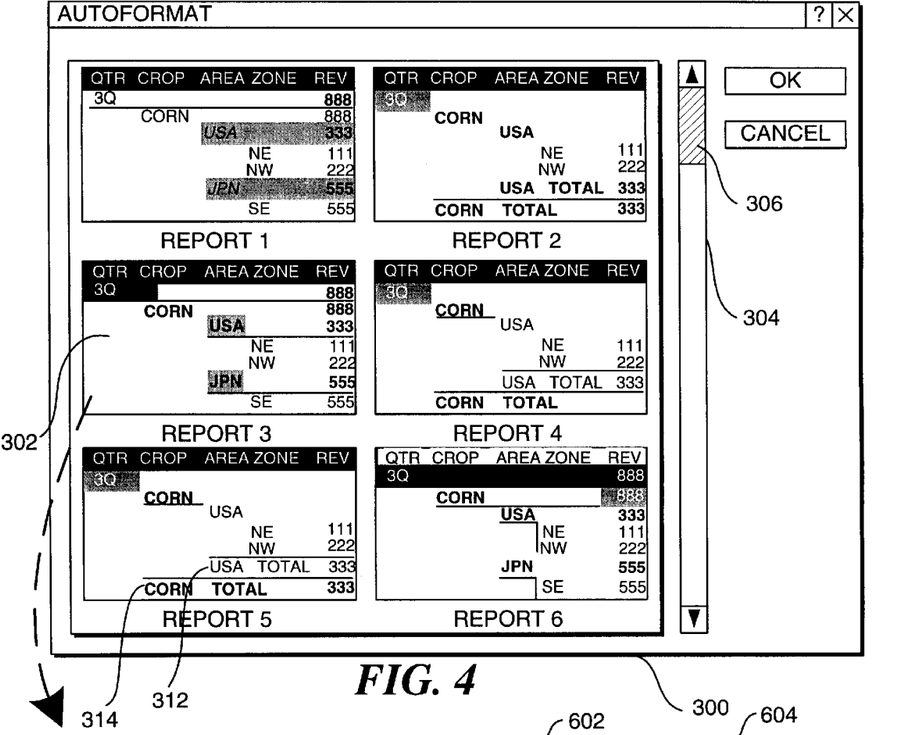
FIG. 4 is an autoformat dialog showing a portion of the banded report format thumbnails used in the present invention to represent the exemplary appearance of a pivot table after it has been automatically reformatted.

When a pivot table or a cell in the pivot table is selected, a pivot table toolbar 200 that lists all of the available fields in the data being used to create (or modify) a pivot table is displayed, such as that shown in FIG. 3. The pivot table toolbar comprises an icon menu bar 202 that includes an icon menu item 204, which is selected to initiate automatically formatting the pivot table. Activation of icon menu item 204 opens an autoformat dialog 300, as shown in FIG. 4. Alternatively, a user can open the autoformat dialog by selecting the "Format->AutoFormat . . . " option from the main menu in the spreadsheet program. The autoformat dialog is a modeless window that graphically portrays various formatting options. These formatting options include ten predefined banded report formats, ten predefined table formats, and a two other formats (discussed below), each identified by an exemplary thumbnail representation of the format provided thereby. FIG. 4 shows the first six banded report formats. The banded report format thumbnail views graphically portray a portion of the banded report associated with the thumbnail to illustrate an approximate appearance of a pivot table that is formatted with that autoformat banded report format. For example, selection of a thumbnail 302 corresponding to a REPORT 3 formatting style was applied to the pivot table shown in FIG. 2 to produce a reformatted pivot table 600 shown in FIG. 5.

Figure 6:
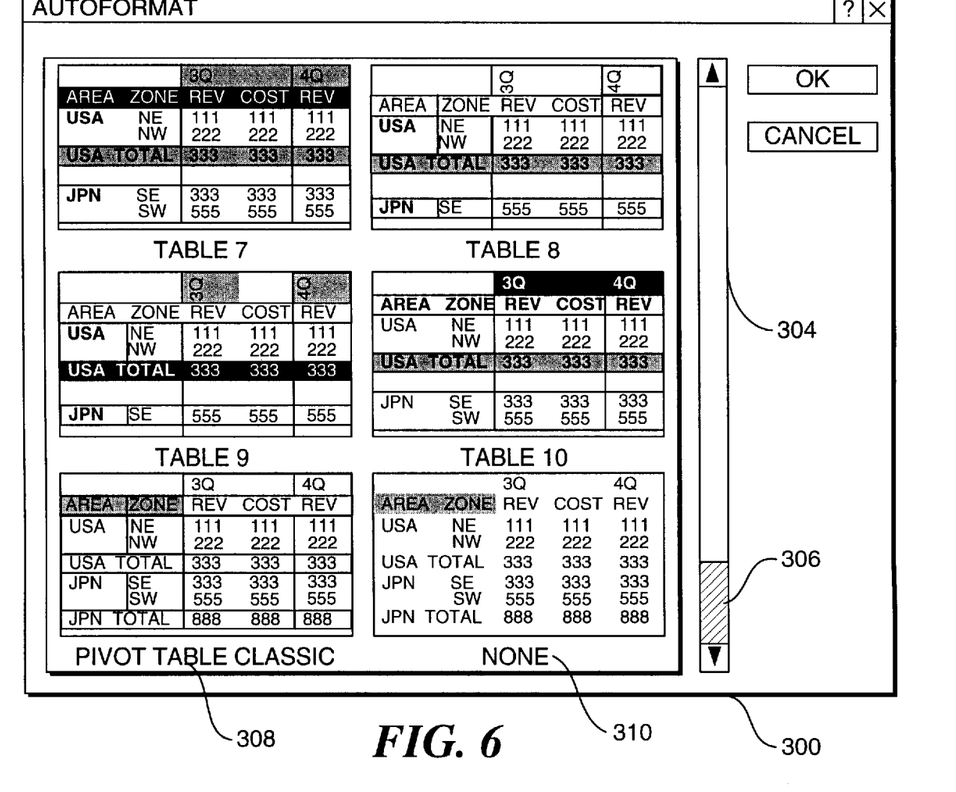
FIG. 6 is the dialog of FIG. 4 showing a portion of the table format thumbnails used in the present invention to represent the exemplary appearance of a pivot table after it has been automatically reformatted.

As shown in FIG. 4, a scroll bar 304 enables a user to move up and down within the display of the available banded report and table format thumbnail views. For example, moving slider 306 to the bottom of scroll bar 304 displays the autoformat thumbnails at the bottom of the list, as shown in FIG. 6. Note that at the bottom of the list are a "PIVOT TABLE CLASSIC" option 308 and a "NONE" option 310. Selection of the "PIVOT TABLE CLASSIC" option can be applied to a pivot table that has been autoformatted to revert the pivot table back to its original format. Selection of the "NONE" option completely removes all formatting from the pivot table. The user can vary the appearance of a pivot table by merely selecting a different format from within the autoformat dialog, and can subsequently reformat a previously-formatted pivot table by selecting a new format option to apply to the already reformatted pivot table.

Figure 7A:
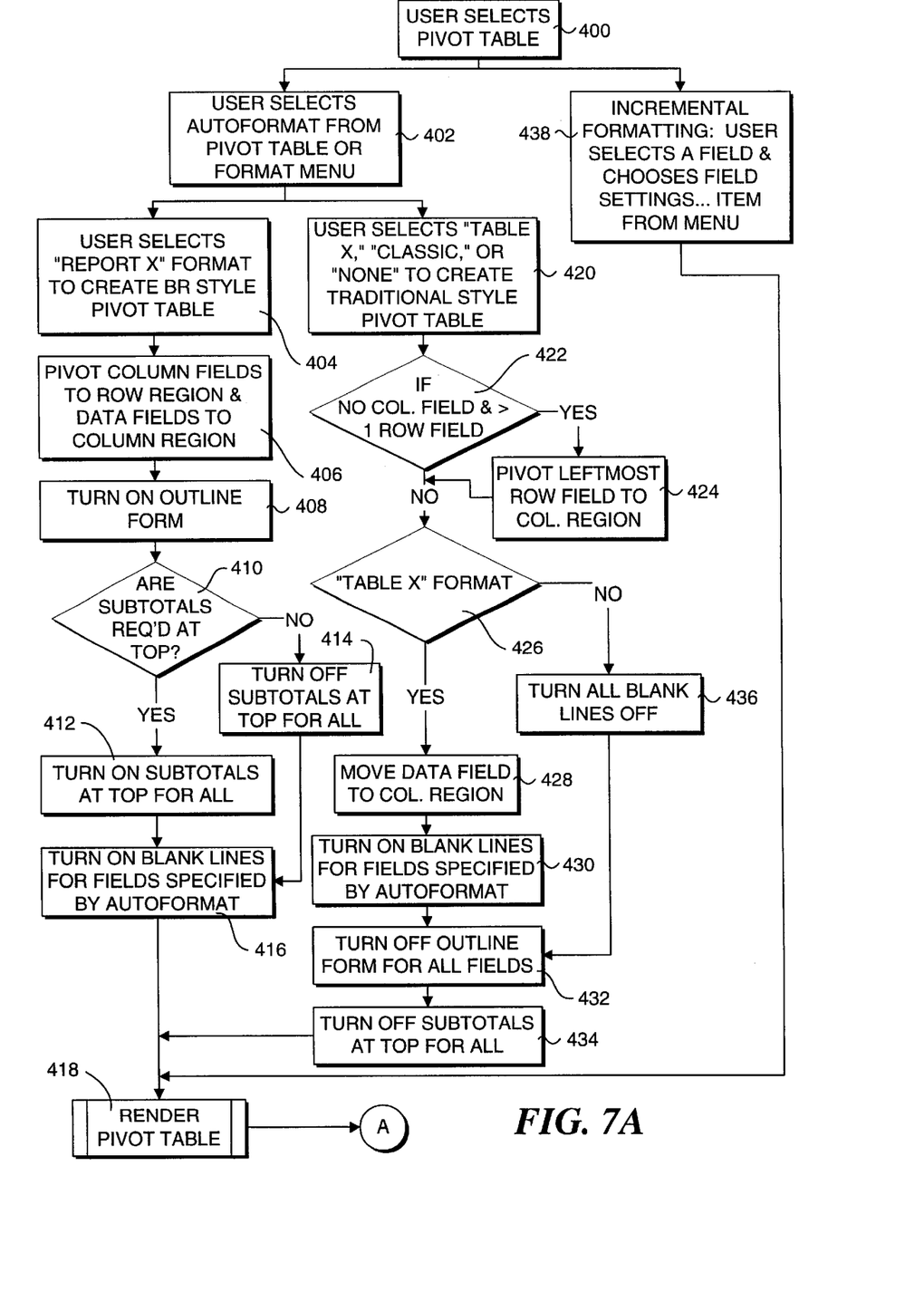
FIGS. 7A and 7B are a flow chart illustrating the logic used in an embodiment of the present invention when reformatting a pivot table.
Figure 7B:
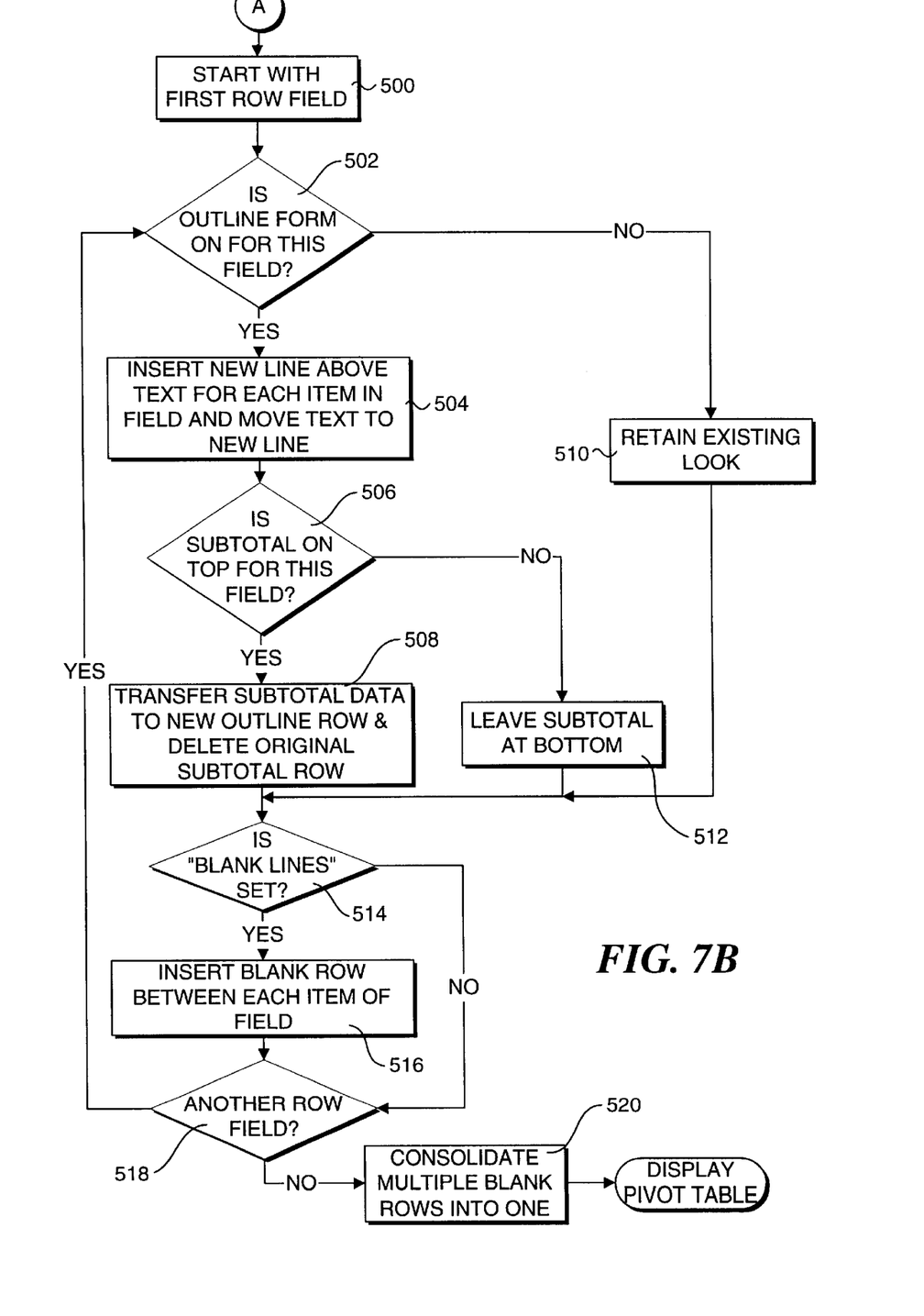

FIGS. 7A and 7B illustrate the logic used in a preferred embodiment of the present invention for automatically formatting a pivot table. The process begins in a block 400, where a user selects a pivot table to be autoformatted. The user can either select the entire pivot table or select a field or fields within the pivot table to automatically enable the icon menu bar on the pivot table toolbar, as well as the drop-down list menu of the pivot table toolbar. The user then opens the dialog for automatically formatting the pivot table by either selecting format report icon 204, selecting the "Format Report . . . " menu option from the drop-down list menu of the pivot table toolbar, or selecting the "Format->AutoFormat . . . " menu option from the main spreadsheet menu, as indicated by a block 402. As discussed above, a user can choose from a plurality of different banded report and table formats, as well as the "classic" and "none" optional styles. If the user selects a banded report format, the logic flows to the left-hand branch of the flow chart to create a banded report style pivot table, as indicated by a block 404.

Next, in a block 406, various fields of the pivot table are pivoted. Column fields are pivoted to row fields, and data fields are pivoted to column fields. Further details of the field pivoting operation are discussed below. An outline form, which enables outline formatting of all fields, is then turned on in a block 408.

In a decision block 410, a determination is made as to whether subtotals are to be included at the top of the report format, which will depend on the selected format. If the answer is yes, the logic proceeds to a block 412, which turns on the subtotals at the top for all applicable fields. If the answer to the query is no, the logic proceeds to a block 414, which turns off the subtotals at the top for all applicable fields. Blank lines for fields specified by the autoformat (if any) are turned on in a block 416, and the pivot table is then rendered in a block 418.

If the user has selected a "TABLE 'X'" format, "PIVOT TABLE CLASSIC," or "NONE," a traditional style tabular pivot table has been chosen, as provided by a block 420. A decision block 422 then determines if there are no column fields and if there is more than one row field. If the answer is yes, the logic flows to a block 424, wherein the left-most row field is pivoted to the column region. Thereafter, of if the determination in decision block 422 was negative, the logic proceeds to a decision block 426.

Decision block 426 determines if one of the "TABLE X" formats has been selected. If the answer is yes, the logic flows to a block 428, where any data field is moved to the column area. The blank lines for fields specified by the autoformat are turned on in a block 430, and the outline form is then turned off for all fields in a block 432. Finally, subtotals at the top are turned off for all fields in a block 434. The logic then proceeds to the block 418. If the answer to decision block 426 is negative, all blank lines are turned off in a block 436, and the logic proceeds to block 432.

As shown by a block 438, a user may optionally incrementally format a pivot table by selecting a field and choosing the "Field Settings . . . " menu item (or optionally a "Field Settings icon on the toolbar), which invokes a set of related dialogs that enable the user to apply formatting characteristics to the pivot table based on a context of the selected field. Details of this process are provided below.

The logic the invention uses for rendering a pivot table is illustrated in FIG. 7B. The process begins in a block 500, which moves the analysis to the first (left-most) row field. Next, in a decision block 502, a determination is made as to whether an outline formatting option is turned on for this field. If the answer is yes, a new line is inserted above the text of each item in the field, and the text is transferred from its former location to the new line in a block 504. Any data in the same row and in columns to the left of the field are also transferred to the new line (in a first instance, there will necessarily be none—consideration of left-adjacent columns are made during subsequent traversal of these steps, as described below). A determination is then made in a decision block 506 as to whether "subtotal on top" is turned on for this field. If the answer is yes, the logic proceeds to a block 508, which transfers the subtotal data values for each outlined data field to the new outlined row, and deletes the original subtotal row.

If the answer to decision block 502 is no, the existing look is retained, as indicated by a block 510. If the answer to decision block 506 is no, the subtotal is left at the bottom, as shown by a block 512. Following either block 510 or block 512, the logic proceeds to a decision block 514.

Decision block 514 is evaluated to determine if the "blank lines" option is set. If the answer is yes, an additional blank row is inserted between each data item of the field in a block 516. Block 516 is bypassed if the answer to decision block 514 is no. A decision block 518 determines if another row field remains to be evaluated. If the answer is yes, the process reverts back to decision block 502. If the answer is no, any multiple blank rows are consolidated into a single row in a block 520, and the pivot table is displayed.

Figure 8:
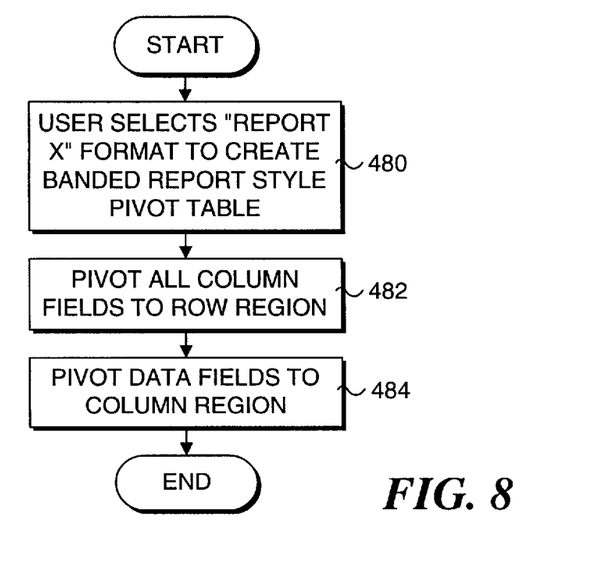
FIG. 8 is a flow chart illustrating the logic generally used by a preferred embodiment of the present invention when rotating fields.

The logic the invention uses when pivoting fields is illustrated in FIG. 8. Pivoting of fields is applicable if the user selects a banded report, i.e., one of the REPORT 1–REPORT 10 formats, as indicated in a block 480. If such a selection has been made, the column fields (those fields in the column field area) are pivoted into row fields in a block 482. For example, compare the pivot table of FIG. 2 with the thumbnail views representing report formats REPORT 2, REPORT 4, and REPORT 5. The "TOTAL" column field has been rotated into the row area in each of these other banded report formats, so that the totals are listed for each hierarchical field grouping. For instance, the REPORT 5 format includes various "total" data labels that have been added in the row region, such as a "USA TOTAL" data label 312 and a "CORN TOTAL" data label 314.

Next, in a block 484, data field labels are pivoted into the column region. For example, the "SUM OF REVENUE" and "SUM OF EXPENSE" data field labels shown in FIG. 2 have been collectively rotated into a REVENUE field 602 and an EXPENSES field 604 in the column region of reformatted pivot table 600 in FIG. 5. In addition, the "SUM OF" has been removed, to improve the aesthetic appearance of the reformatted pivot table. Similarly, if "SUM OF REVENUE" had been "AVE OF REVENUE" then the "AVE OF" would have been likewise removed. This step completes the pivoting of fields.

Figure 9:
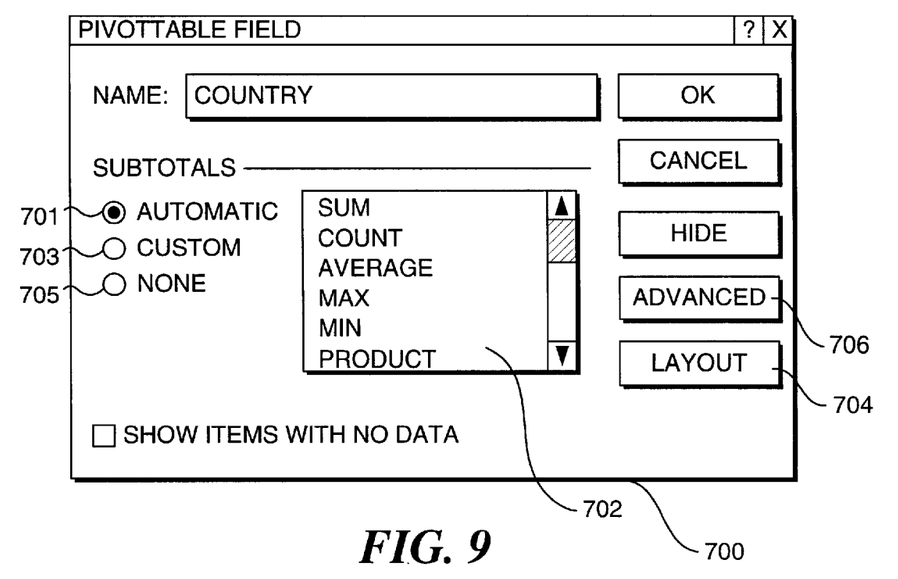
FIG. 9 shows a pivot table field dialog that enables a user to choose a function for a selected field within a pivot table and provides access to other options related to format.

A user may choose to manually apply formatting changes to either an originally-formatted pivot table or a reformatted pivot table by selecting a "field settings" icon 206 (see FIG. 3), or selecting the "Field Settings" menu item from the drop-down list menu of the pivot table toolbar. Either selection will bring up a pivot table field dialog 700, as shown in FIG. 9. The contents of the dialog are context sensitive relative to the field that is presently selected in the pivot table. In this instance, the Country field has been selected in the pivot table. The user may modify the subtotals calculated during reformatting by selecting a different or an additional function to be applied to the data for the current field from a list 702, such as displaying an average value in place of or in addition to a total (sum) value. The user may choose an "Automatic" radio button 701, a "Custom" radio button 703, or a radio button 705 labeled "None" in this dialog to indicate where the calculated results will be displayed. The Automatic option subtotals each item in an outer row or column field, while the Custom option subtotals each item in an inner row or column field. The user can also selectively choose to display items in the page, row, or column regions that have no data.

Figure 10:
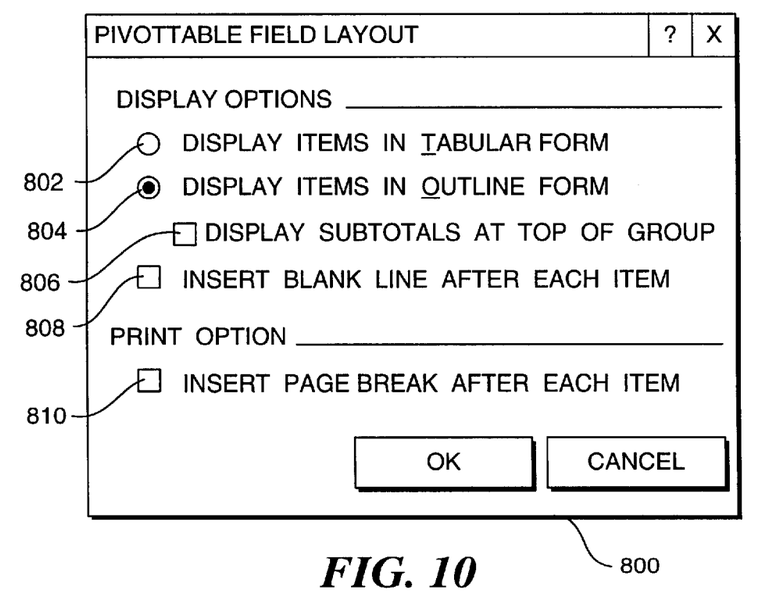
FIG. 10 is a pivot table layout dialog that is accessible from the dialog of FIG. 9 to enable a user to select options that vary the layout of a selected field in the pivot table.

The user may choose to change the layout of the field and its associated subtotals by activating a "layout" button 704, which will bring up a pivot table field layout dialog 800, as shown in FIG. 10. At the top of the dialog is a display options section, in which a user can choose between displaying items corresponding to the current selected field in tabular form or outline form by activating radio buttons 802 and 804, respectively. The default setting for these radio buttons is the present state of the pivot table. The user may choose to display subtotals at the top of each group by checking a checkbox control 806 and may choose to insert a blank line after each item corresponding to the selected field by checking a checkbox control 808. The lower portion of the dialog includes an option to insert a page break after each item, which can be selected by entering a check in a checkbox control 810. This option will force a printed pivot table to print each item (for the currently selected field) on a new page, and will print the field names for the pivot table on each new page.

The user may also activate an "advanced" button 706 on the pivot table field dialog to activate a pivot table advanced options dialog (not shown) that enables the user to select various options, including page field options, automatic sorting options, and automatic display of data calculation options. The automatic sorting options enable data items that comprise a given field to be automatically ordered in an ascending or descending order, or to be manually ordered.

Figure 5:
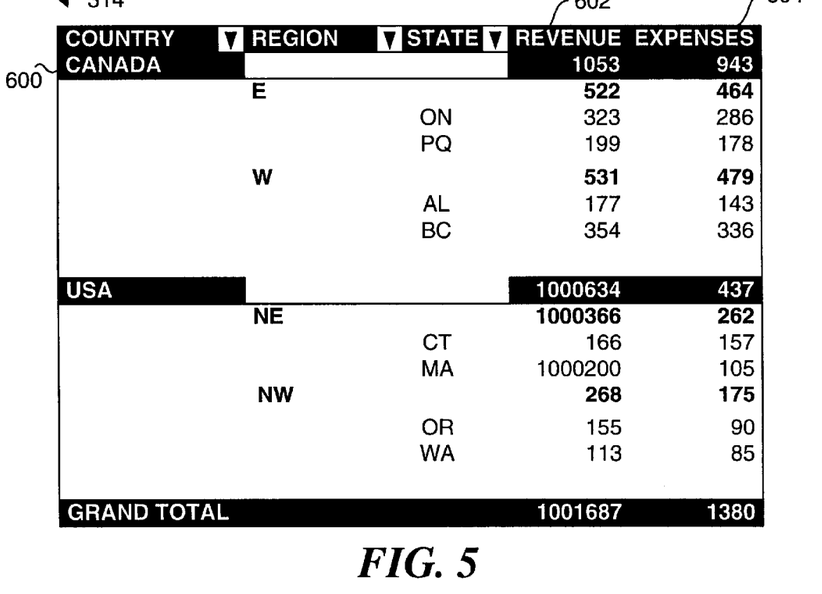
FIG. 5 is the pivot table of FIG. 2 after it has been reformatted using one of the banded report autoformat options.
Figure 11:
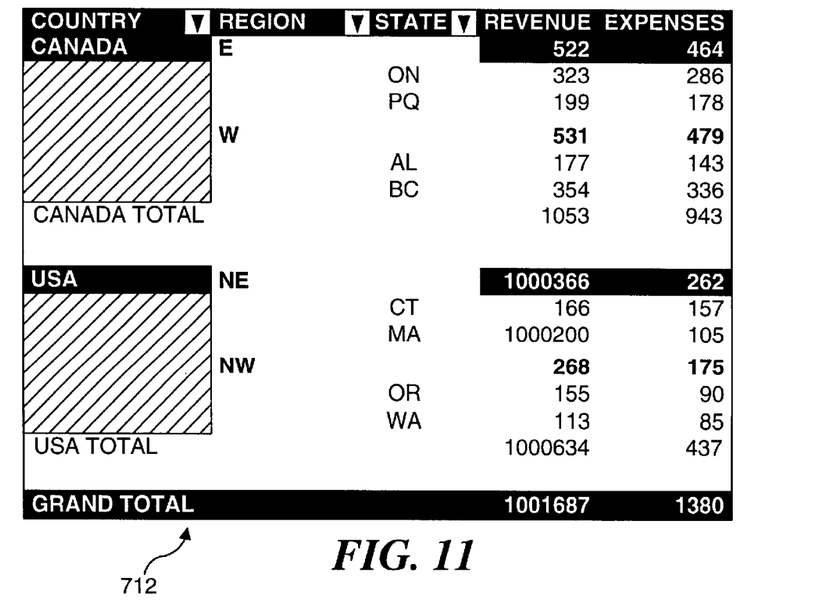
FIG. 11 is an incrementally reformatted version of the pivot table in FIG. 5, after a user has chosen an option to place group totals at the bottom of each group.
Figure 12:
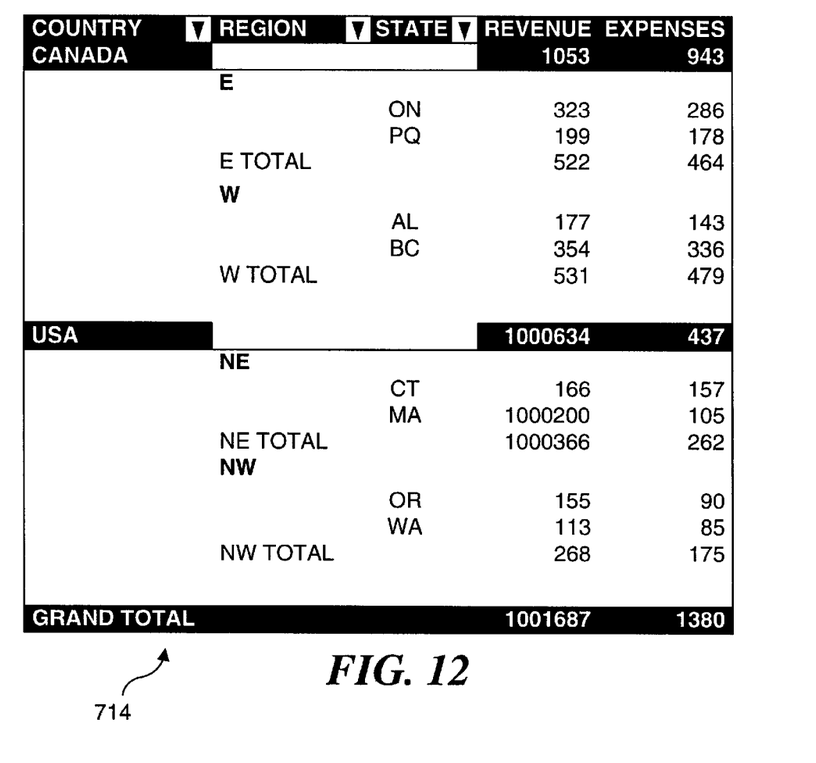
FIG. 12 is an incrementally reformatted version of the pivot table in FIG. 5, after a user has chosen an option to display a field (Region) in outline format and an option to place totals of groups within that field at the bottom of each group within that field.

FIGS. 11 and 12 illustrate the pivot table of FIG. 5 after manual reformatting. To achieve the pivot table of FIG. 11 by modifying the banded report layout (Report 3) shown in FIG. 5, the Country field was selected (i.e., any item in the Country field), and the field settings icon was activated so that the layout button could be selected, thereby bringing up the pivot table field layout dialog. The "display subtotals at top of group" checkbox was then cleared (unchecked—it is checked by default when using the REPORT 3 format corresponding to the pivot table of FIG. 5). The appropriate OK buttons were then selected, resulting in the pivot table shown in FIG. 11. Note that this pivot table now displays a total at the bottom of each group in the Country field, namely in a row labeled "CANADA TOTAL" and in a row labeled "USA TOTAL." In addition, the previous "on top" total values have been moved to the new total lines, and the first instances of the next subgroup in the hierarchy (the Region field data items E and NE) respectively share the same line as the "CANADA" and "USA" Country items.

FIG. 12 shows how the pivot table of FIG. 5 is reformatted after a different manual change has been applied. To obtain this result, the Region field (i.e., any item in the column for the Region field) was selected, and the "field settings" menu option was activated. The option to display the items in outline form was chosen by activating radio button 804, and the option to not display subtotals at the top of the group was selected by unchecking checkbox control 806. As a result, the Region field items (E, W, NE, and NW) are emphasized by inserting them in a new otherwise empty row above their previous locations. In this instance, since there are no data in the same row and columns to the left of the Region field items being emphasized, there are no data to also move into the new line, which would have occurred if such data existed. A new subtotal line was also added for each item, and the previous subtotals on top were moved to a new subtotal line for each item. The logic that a preferred embodiment of the present invention uses for applying manual reformatting is substantially the same as that disclosed above in conjunction with the discussion of FIGS. 7A–B.

Figure 13:
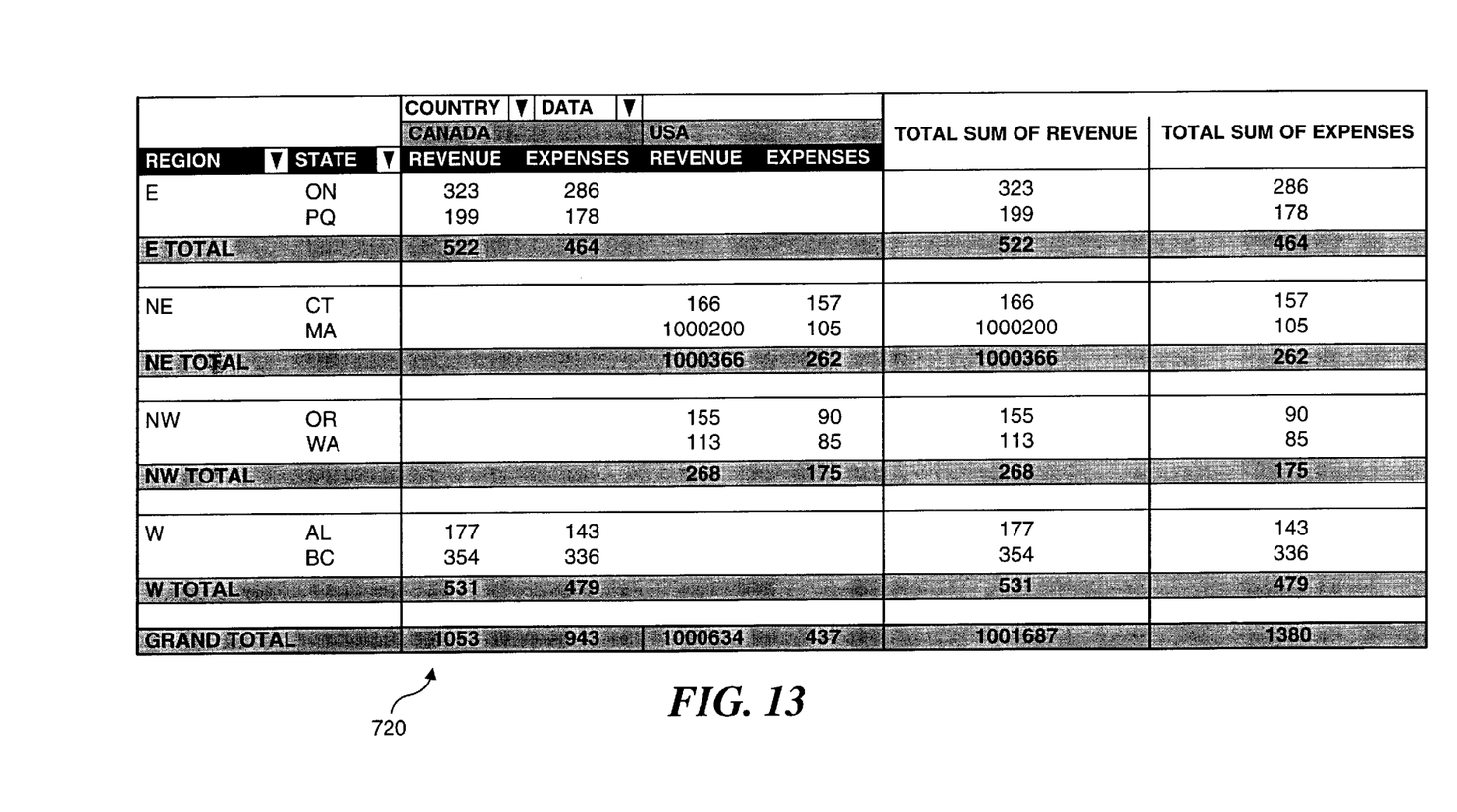
FIG. 13 is an exemplary pivot table that has been automatically reformatted using a predefined table format.

A user may optionally choose to apply a predefined tabular format to the pivot table by selecting one of the TABLE 1–10 formatting options. Application of the TABLE 1 format to the pivot table of FIG. 2 results in a reformatted pivot table 720 shown in FIG. 13. The logic used by the invention in producing reformatted or manually formatted tables was discussed above in regard to FIG. 7A.

It should be noted that a significant feature of the invention is that the reformatted pivot table maintains its original functionality. Specifically, a user can manipulate a reformatted pivot table the same way the user could manipulate the originally-formatted pivot table. For instance, the user can still use the "drilldown" feature associated with EXCEL pivot tables to select data to be displayed, as well as use the drop-down list controls associated with various fields for filtering data. Likewise, the user could perform any manipulation on the reformatted pivot table that could be performed on the original, including changing fields to different pivot table regions, moving fields about within the regions, and changing the functions that are calculated with the data.

The formatting of a pivot table in a preferred embodiment of the present invention is tied to the table itself, and not to the individual cells of the table. For instance, when a user formats a table in a spreadsheet, the formatting is attached to each of the cells in the table, so that if a cell is moved, its format goes along with it. In contrast, the automatically reformatted pivot tables maintain their relative formatting, so that the formatting is still based on a hierarchical arrangement of data.

Exemplary Operating Environment

Figure 14:
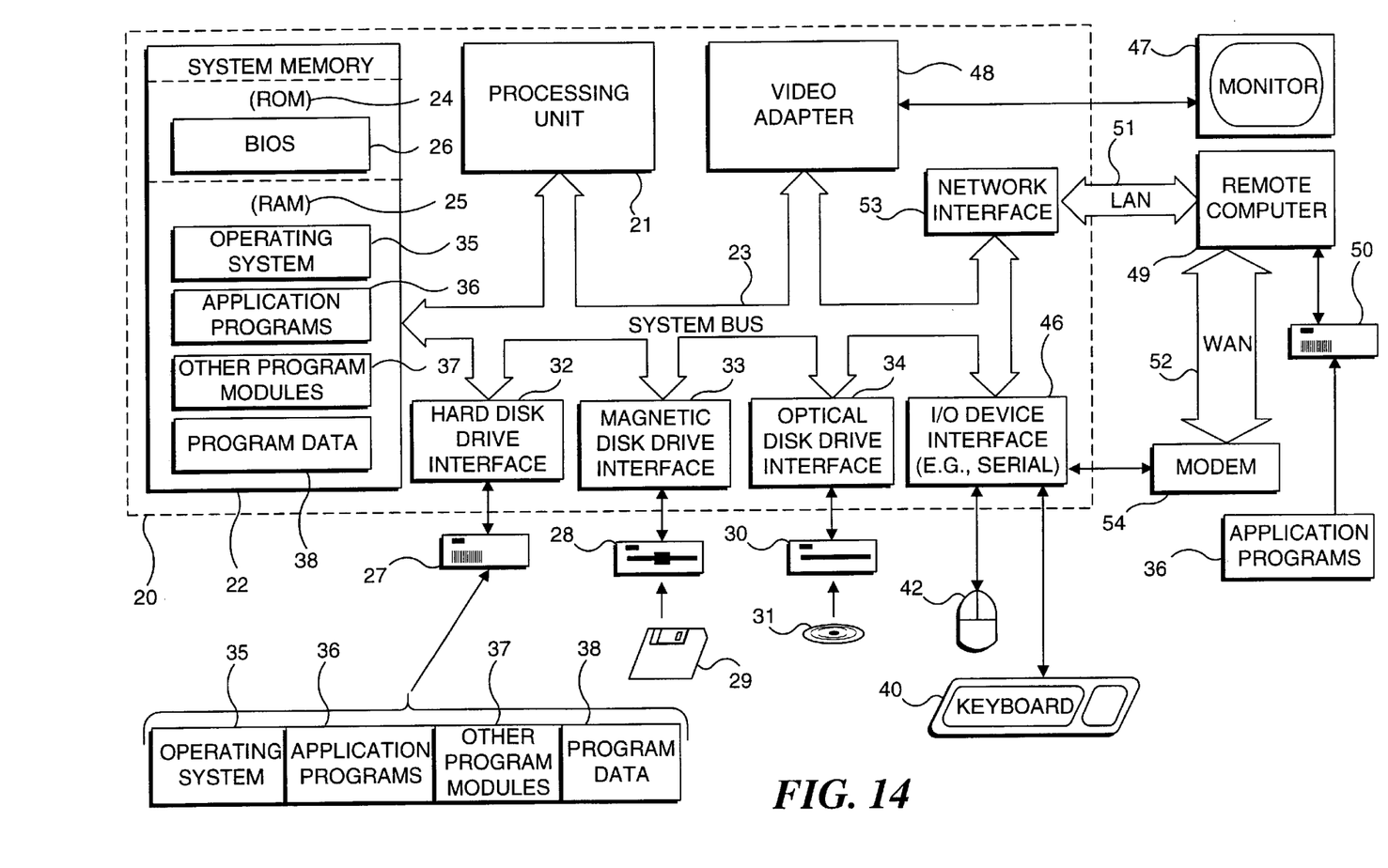
FIG. 14 is a block diagram of a generally conventional computer that is usable in implementing the present invention.

FIG. 14 and the following discussion are intended to provide a brief, general description of a suitable computing environment in which the invention may be implemented. Although not required, the invention will be described in the general context of computer executable instructions, such as program modules, being executed by a personal computer, e.g., the program modules that comprise a spreadsheet program in which the present invention is implemented. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 14, an exemplary system for implementing the invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within personal computer 20, such as during start-up, is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules, and other data for personal computer 20. Although the exemplary environment described herein employs a hard disk, removable magnetic disk 29, and removable optical disk 31, it should be appreciated by those skilled in the art that other types of computer-readable media which can store data that is accessible by a computer, such as magnetic cassettes, flash memory cards, digital video disks, Bernoulli cartridges, RAM, ROM, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 14. The logical connections depicted in FIG. 14 include a local area network (LAN) 51 and a wide area network (WAN) 52. Such networking environments are commonplace in offices, enterprise-wide computer networks, Intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

Although the present invention has been described in connection with a preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to selectively automatically reformat a spreadsheet pivot table that was produced from a specified set of data, said spreadsheet pivot table having an original format and an original functionality, comprising the steps of:
   (a) providing a user interface that enables a user to select a predefined banded report format to be applied to the pivot table from a plurality of predefined formats that include at least one of the predefined banded report format and a predefined tabular report format; and
   (b) automatically reformatting the spreadsheet pivot table based on the predefined banded report format selected by the user, wherein a reformatted pivot table that is produced thereby maintains the original functionality, enabling the user to perform any pivot table operations on the reformatted pivot table that could be performed on the spreadsheet pivot table prior to the step of reformatting, including drilldown, filtering, changing fields to different pivot table regions, moving fields within regions, changing calculation functions, and any other direct manipulation operations that could be performed on the pivot table prior to the step of reformatting.

2. The method of claim 1, wherein the user interface comprises a dialog including a plurality of selectable thumbnail images that provide a visual representation of a format to be applied to the spreadsheet pivot table to achieve the reformatted pivot table.

3. The method of claim 1, wherein the plurality of predefined formats further include a standard format option that when selected, substantially returns a reformatted pivot table back to its original format.

4. The method of claim 1, wherein the pivot table comprises a plurality of data items organized by fields in a hierarchical relationship, and wherein the plurality of predefined formats include at least one banded report format that displays subtotals for a data item of a field in a line with the data item.

5. The method of claim 1, wherein the plurality of predefined formats include different options for at least one of a font style, a color, a background, and a border.

6. The method of claim 1, wherein the set of data includes a plurality of fields, and wherein the spreadsheet pivot table comprises a row region that may include one or more row fields and one or more data labels, a data region for displaying calculated numerical data associated with one or more fields, and a column region that may include one or more column fields, said step of automatically reformatting the pivot table into a selected banded report format comprising the steps of:
   (a) pivoting the column fields to the row region; and
   (b) pivoting the data labels to the column region.

7. A computer-readable medium comprising executable instructions for performing the method recited in claim 6.

8. The method of claim 1, wherein the pivot table comprises data sets that are grouped in hierarchical levels, said step of automatically reformatting the pivot table into a selected banded report format comprising the step of inserting a blank row between different hierarchical levels in the reformatted pivot table.

9. The method of claim 1, wherein a specific format is associated with the reformatted pivot table and is maintained even though a user changes data included within the reformatted pivot table.

10. A computer-readable medium comprising executable instructions for performing the method recited in claim 1.

11. A method for enabling a user to selectively modify a format of a spreadsheet pivot table that was produced from a specified set of data, said spreadsheet pivot table comprising a plurality of columns and rows that include data items, data labels, and calculated numerical data, the spreadsheet pivot table further having an original functionality, the method comprising the steps of:
   (a) enabling a user to select a field to be emphasized in the spreadsheet pivot table;
   (b) automatically identifying data items in the field that was selected, corresponding to said field; and (c) modifying the format of the spreadsheet pivot table so that each data item in the field that was selected is emphasized in the spreadsheet pivot table by automatically moving said data item into a new row inserted above a previous row of said data item, wherein the pivot table as modified maintains its original functionality, enabling the user to perform drilldown, filtering, changing fields to different pivot table regions, moving fields within regions, changing calculation functions, and any other direct manipulation pivot table operations on said pivot table that could have been performed on the pivot table prior to its modification.

12. The method of claim 11, wherein any data items in columns to the left of and sharing the same row as the data item that was moved are also moved to the new row.

13. The method of claim 11, wherein the user can select the field to be emphasized by selecting a data item corresponding to the field.

14. The method of claim 11, wherein the spreadsheet pivot table includes a row region in which one or more field names from the set of data may be included, and wherein the user can select the field to be emphasized by selecting a field name in the row region.

15. The method of claim 11, further comprising the steps of:
(a) enabling a user to selectively add rows after each data item corresponding to the field that was selected; and
(b) inserting a blank row immediately above each data item except for a topmost data item in said field.

16. The method of claim 11, wherein each data item corresponding to the field that was selected relates to a hierarchical level that defines a group, further comprising the steps of:
(a) enabling a user to selectively display subtotals at a top of each group; and
(b) inserting a subtotal value corresponding to a calculation based on numerical data corresponding to the group in the same row as a data item for the field selected to be emphasized.

17. The method of claim 11, further comprising the steps of:
(a) enabling a user to selectively insert a page break after each data item of the field that was selected; and
(b) printing pages of the pivot table so that each printed page comprises data grouped on a single data item of said field, including data in hierarchical levels below the single data item, a first row on each page comprising field names of the spreadsheet pivot table.

18. A system for creating a predefined banded table report from a spreadsheet pivot table that was produced from a specified set of data, said spreadsheet pivot table having an original format and an original functionality, comprising:
(a) a memory in which a plurality of machine instructions are stored; and
(b) a processor, coupled to the memory and responsive to the machine instructions, the machine instructions, when executed by the processor, causing the processor to:
(i) provide a user interface that enables a user to select a predefined banded report format to be applied to the pivot table from a plurality of predefined formats that include at least one of the predefined banded report format and a predefined tabular report format; and
(ii) automatically reformat the spreadsheet pivot table based on the predefined banded report format selected by the user, wherein a reformatted pivot table that is produced thereby maintains the original functionality, enabling the user to perform any pivot table operations on the reformatted pivot table that could be performed on the spreadsheet pivot table prior to the reformatting, including drilldown, filtering, changing fields to different pivot table regions, moving fields within regions, changing calculation functions, and any other direct manipulation operations that could be performed on the pivot table prior to the step of reformatting.

19. The system of claim 18, wherein the set of data includes a plurality of fields, and wherein the spreadsheet pivot table comprises a row region that may include one or more row fields and one or more data labels, a data region for displaying calculated numerical data associated with one or more fields, and a column region that may include one or more column fields, and wherein execution of the machine instructions further causes the processor to automatically reformat the pivot table into a selected banded report format by performing the steps of:
(a) pivoting the column fields to the row region; and
(b) pivoting the data labels to the column region.

* * * * *